(12) United States Patent
Lin et al.

(10) Patent No.: US 11,952,466 B2
(45) Date of Patent: Apr. 9, 2024

(54) BINDER COMPOUND AND METHOD FOR PREPARING SAME

(71) Applicant: CONTEMPORARY AMPEREX TECHNOLOGY CO., LIMITED, Fujian (CN)

(72) Inventors: Jianghui Lin, Fujian (CN); Yanjie Zhao, Fujian (CN); Xing Li, Fujian (CN); Haizu Jin, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/381,178

(22) Filed: Oct. 18, 2023

(65) Prior Publication Data

US 2024/0052110 A1 Feb. 15, 2024

Related U.S. Application Data

(63) Continuation of application No. PCT/CN2022/118740, filed on Sep. 14, 2022.

(30) Foreign Application Priority Data

Oct. 12, 2021 (CN) .......................... 202111186129.2

(51) Int. Cl.
*C08G 79/14* (2006.01)
*H01M 4/62* (2006.01)

(52) U.S. Cl.
CPC ............ *C08G 79/14* (2013.01); *H01M 4/623* (2013.01); *H01M 2220/20* (2013.01)

(58) Field of Classification Search
None
See application file for complete search history.

(56) References Cited

U.S. PATENT DOCUMENTS

2017/0298168 A1* 10/2017 Reineke ................... C09J 7/387
2022/0278331 A1* 9/2022 Zhong ................ C09D 133/064

FOREIGN PATENT DOCUMENTS

CA 2308988 A1 11/2000
CN 1539550 A * 10/2004
(Continued)

OTHER PUBLICATIONS

CN-1539550-A English machine translation (Year: 2003).*
(Continued)

*Primary Examiner* — Scott J. Chmielecki
(74) *Attorney, Agent, or Firm* — XSENSUS LLP

(57) ABSTRACT

The present application relates to a binder compound of formula (I), a method for preparing the same, and an electrode sheet comprising the same. In formula (I), $R_1$, $R_2$, and $R_3$ each independently represents an unsubstituted or substituted linear or branched alkyl with 1-6 carbon atoms, or an unsubstituted or substituted aryl with 6-20 carbon atoms; $R_4$ represents —COOM; $R_5$ represents a bridging oxo or bridging imino; each M independently represents one of (Continued)

Li, Na, K, Rb, and Cs; Z represents a linear or branched alkylene with 1-6 carbon atoms; m is an integer selected from 7,600 to 47,000; n is an integer selected from 1,520 to 94,000; and m/n=0.1-10.

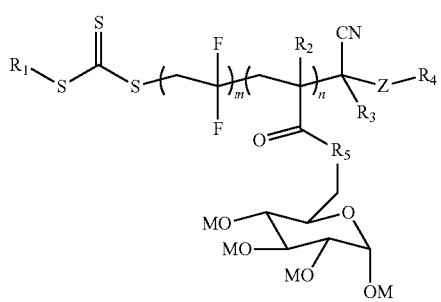

(I)

17 Claims, 3 Drawing Sheets

(56) References Cited

FOREIGN PATENT DOCUMENTS

| CN | 101877393 A | 11/2010 |
|----|-------------|---------|
| CN | 103160224 A | 6/2013 |
| CN | 103214619 A | 7/2013 |
| CN | 103828115 A | 5/2014 |
| CN | 104245829 A | 12/2014 |
| CN | 104497190 A | 4/2015 |
| CN | 104877593 A | 9/2015 |
| CN | 105027338 A | 11/2015 |
| CN | 106433530 A | 2/2017 |
| CN | 109957360 A | 7/2019 |
| CN | 109962239 A | 7/2019 |
| CN | 113024748 A | 6/2021 |
| WO | 2012/066600 A1 | 5/2012 |
| WO | 2014/188724 A1 | 11/2014 |
| WO | 2015/098507 A1 | 7/2015 |

OTHER PUBLICATIONS

International Search Report and Written Opinion dated Dec. 14, 2022, received for PCT Application PCT/CN2022/118740, filed on Sep. 14, 2022, 13 pages including English Translation.

Lacey et al., "Porosity Blocking in Highly Porous Carbon Black by PVdF Binder and its Implications for the Li-S System", Department of Chemistry—Ångström Laboratory, vol. 118, Issue 45, Nov. 13, 2014, 3 pages.

First Office Action dated Sep. 4, 2023, received for CN Application 202111186129.2, 11 pages including English Translation.

Notice of Decision of Granting Patent Right for Invention dated Oct. 7, 2023 received for CN Application 202111186129.2, 3 pages including English Translation.

Office Action issued Jan. 23, 2024 in Japanese Patent Application No. 2023-546147 with machine English translation thereof, citing above-listed references.

Office Action issued Dec. 26, 2023 in Korean Patent Application No. 10-2023-7025802 with machine English translation thereof.

* cited by examiner

BINDER COMPOUND AND METHOD FOR PREPARING SAME

CROSS-REFERENCE TO RELATED APPLICATIONS

The present application is a continuation of International Application No. PCT/CN2022/118740, filed Sep. 14, 2022, which claims benefit of priority from Chinese Patent Application No. 202111186129.2, filed Oct. 12, 2021, each is incorporated herein by reference in its entirety.

TECHNICAL FIELD

The present application relates to the technical field of lithium batteries, and particularly relates to a binder compound, a method for preparing the same, as well as an electrode sheet, a secondary battery, a battery module, a battery pack and an electrical apparatus comprising the binder compound.

BACKGROUND ART

In recent years, with the increasingly wide application range of lithium-ion batteries, they are applied to various energy storage power systems, so that higher requirements are also put forward for performance of the lithium-ion batteries. It is found in researches that performance of a lithium-ion secondary battery (such as a capacity retention rate) will be affected by many factors, such as a service condition, an electrode sheet, an electrolyte solution, and a separator.

As for the electrode sheet, both binding force and conductivity of the electrode sheet will affect the capacity retention rate of the battery. Therefore, as an important component in the preparation of the lithium-ion secondary battery, a binder has become a research hot spot in this field.

Binders commonly used in the lithium-ion batteries can generally be divided into two major categories: water-based binders and oil-based binders. The oil-based binder represented by polyvinylidene fluoride (PVDF) has good binding property, electrochemical stability, thermodynamic stability, and swellability, but its water insolubility leads to the necessity of using an organic solvent in the preparation of an electrode sheet slurry, which is costly and is not environmentally friendly. However, the water-based binder represented by sodium carboxymethyl cellulose (CMC-Na) has a slightly inferior binding property to the oil-based binder, despite that it can use water which is more economical and environmentally friendly as a solvent because of its water solubility.

Therefore, there is a need in this field for such a binder that combines one or more advantages of the water-based binder and the oil-based binder, such as good binding property, stable chemical property, and swellability.

SUMMARY OF THE DISCLOSURE

In order to solve the above problems, the present application provides a binder compound, which has water solubility, good binding property, stable chemical property, and swellability.

Specifically, the present application provides a binder compound of formula (I), a method for preparing the same, as well as an electrode sheet, a secondary battery, a battery module, a battery pack, and an electrical apparatus comprising the binder compound.

A first aspect of the present application provides a binder compound of formula (I):

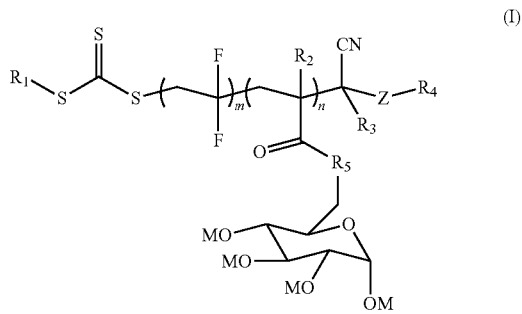

wherein
$R_1$, $R_2$, and $R_3$ each independently represents an unsubstituted or substituted linear or branched alkyl with 1-6 carbon atoms, or an unsubstituted or substituted aryl with 6-20 carbon atoms;
$R_4$ represents —COOM;
$R_5$ represents a bridging oxo or bridging imino;
each M independently represents one of Li, Na, K, Rb, and Cs;
Z represents a linear or branched alkylene with 1-6 carbon atoms;
m is an integer selected from 7,600 to 47,000;
n is an integer selected from 1,520 to 94,000; and
m/n=0.1-10.

Therefore, the present application provides a binder compound, which has good binding property, water solubility, stable chemical property, and swelling property, and is capable of improving ion conductance of electrode sheets and reducing polarization, thereby improving battery cell performance (e.g., a capacity retention performance) of a secondary battery.

In any embodiment, in formula (I), $R_1$ and $R_3$ each independently represents an unsubstituted linear or branched alkyl with 1-6 carbon atoms; and optionally, $R_1$ and $R_3$ each independently represents an unsubstituted linear alkyl with 1-6 carbon atoms.

In any embodiment, in formula (I), $R_2$ represents an unsubstituted linear or branched alkyl with 1-6 carbon atoms or phenyl; and optionally, $R_2$ represents an unsubstituted linear alkyl with 1-6 carbon atoms or phenyl.

As mentioned above, a structure of the binder compound of formula (I) is further selected, to further improve its binding property, dispersibility, etc., and further improve binding effects.

In any embodiment, in formula (I), m is an integer selected from 7,600 to 30,000.

In any embodiment, in formula (I), n is an integer selected from 1,520-46,000; and optionally, n is an integer selected from 1,520-18,000.

In any embodiment, in formula (I), m/n=0.3-7.5; and optionally, m/n=0.5-7.5.

As mentioned above, m, n, and m/n are further selected, to further improve the binding property, swellability, chemical stability, and processability of the binder compound, thereby improving conductivity of the electrode sheets, reducing the polarization, and improving the battery cell performance of the secondary battery.

A second aspect of the present application provides a method for preparing a binder compound of formula (I):

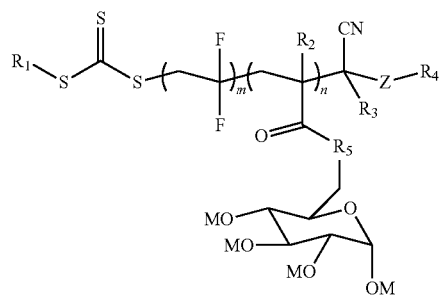

(I)

wherein $R_1$, $R_2$, and $R_3$ each independently represents an unsubstituted or substituted linear or branched alkyl with 1-6 carbon atoms, or an unsubstituted or substituted aryl with 6-20 carbon atoms;

$R_4$ represents —COOM;

$R_5$ represents a bridging oxo or bridging imino;

each M independently represents one of Li, Na, K, Rb, and Cs;

Z represents a linear or branched alkylene with 1-6 carbon atoms;

m is an integer selected from 7,600 to 47,000;

n is an integer selected from 1,520 to 94,000; and m/n=0.1-10.

The method includes the following steps:

(i) allowing a polymerization reaction of a vinylidene fluoride monomer in the presence of a chain transfer agent of formula (II) to obtain a polymer of formula (III):

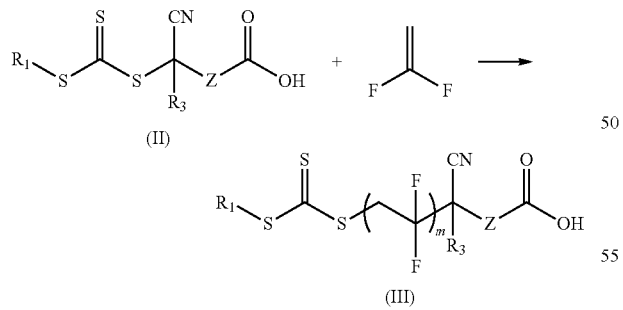

wherein $R_1$, $R_3$, Z, and m are defined as above respectively; and optionally, the chain transfer agent of formula (II) is 4-cyano-4-thioylthiopropylsulfanyl pentanoic acid;

(ii) allowing a polymerization reaction between a glucose acrylic acid derivative of formula (IV) and polyvinylidene fluoride of formula (III) to obtain a polymer of formula (I'):

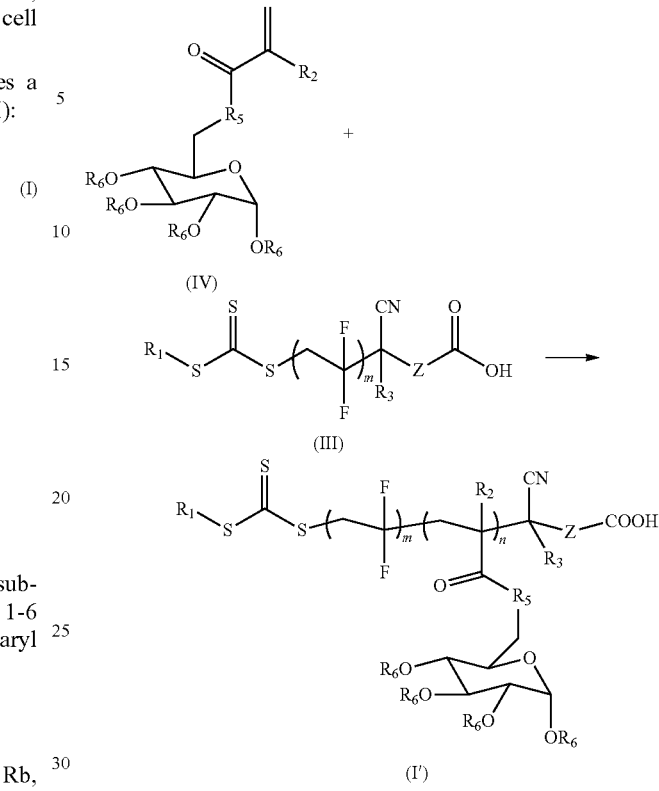

wherein $R_1$, $R_2$, $R_3$, Z, m, n, and m/n are as defined above respectively, $R_5$ represents a bridging oxo or bridging imino, and $R_6$ represents acetyl;

and (iii) reacting the polymer obtained in the step (ii) with an alkali metal alkoxide $R_7$OM to obtain the binder compound of formula (I):

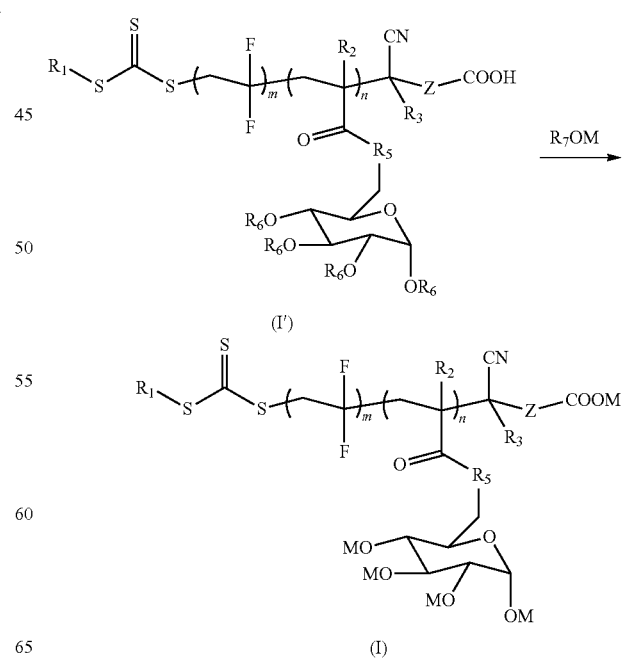

wherein $R_7$ is selected from a linear or branched alkyl with 1-6 carbon atoms, and is optionally selected from methyl or ethyl.

The method for preparing a binder compound of the present application is provided above.

In any embodiment, the glucose acrylic acid derivative of formula (IV) is obtained from glucose or 6-aminoglucose by:

(1) reacting glucose or 6-aminoglucose with a first protective reagent, so that 6-primary hydroxyl or primary amino thereof is protected by a first protective group;

(2) reacting the product in the step (1) with acetic anhydride, so that 1-hydroxyl to 4-hydroxyl thereof are protected by acetyl;

(3) removing the first protective group from the product in the step (2); and (4) reacting the product in the step (3) with acryloyl chloride or a derivative thereof to obtain the glucose acrylic acid derivative of formula (IV).

In any embodiment, the first protective reagent is triphenylchoromethane, and the first protective group is triphenylmethyl.

In any embodiment, the step (3) is performed in the presence of hydrogen bromide.

A method for preparing a glucose acrylic acid derivative of formula (IV) is provided above. Further, reaction reagents and conditions are selected, thereby favorably controlling occurrence of side reactions, and guaranteeing purity of synthetic products, on the premise of keeping a good reaction rate.

A third aspect of the present application provides an electrode sheet, comprising a current collector and an electrode sheet material layer provided on at least one surface of the current collector, wherein the electrode sheet material layer comprises the binder compound in the first aspect of the present application or the binder compound prepared using the preparation method in the second aspect of the present application.

In any embodiment, the electrode sheet is a negative electrode sheet.

In any embodiment, the electrode sheet material layer of the negative electrode sheet comprises 0.1-10 wt %, optionally 0.5-3 wt %, of the binder compound based on a total weight of the electrode sheet material layer. A percentage content of the binder compound comprised in a negative electrode material layer of the negative electrode sheet is controlled within the above range, so that the electrode sheet has an appropriate active material content, low resistance, and low polarization, and the battery cell has appropriate energy density, whilst ensuring binding effects of the binder compound therein.

A fourth aspect of the present application provides a secondary battery, comprising the binder compound in the first aspect of the present application, or the binder compound obtained using the preparation method in the second aspect of the present application, or the electrode sheet in the third aspect of the present application.

A fifth aspect of the present application provides a battery module, comprising the secondary battery in the fourth aspect.

A sixth aspect of the present application provides a battery pack, comprising the battery module in the fifth aspect.

A seventh aspect of the present application provides an electrical apparatus, comprising at least one selected from the secondary battery in the fourth aspect of the present application, the battery module in the fifth aspect of the present application, or the battery pack in the sixth aspect of the present application.

The binder compound in the present application has good binding property, water solubility, stable chemical property, and swelling property; and an electrode sheet comprising the binder compound has high ion conductance and low polarization, thereby improving battery cell performance (e.g., capacity retention performance) of the secondary battery.

DESCRIPTION OF REFERENCE NUMERALS

Figure 1:
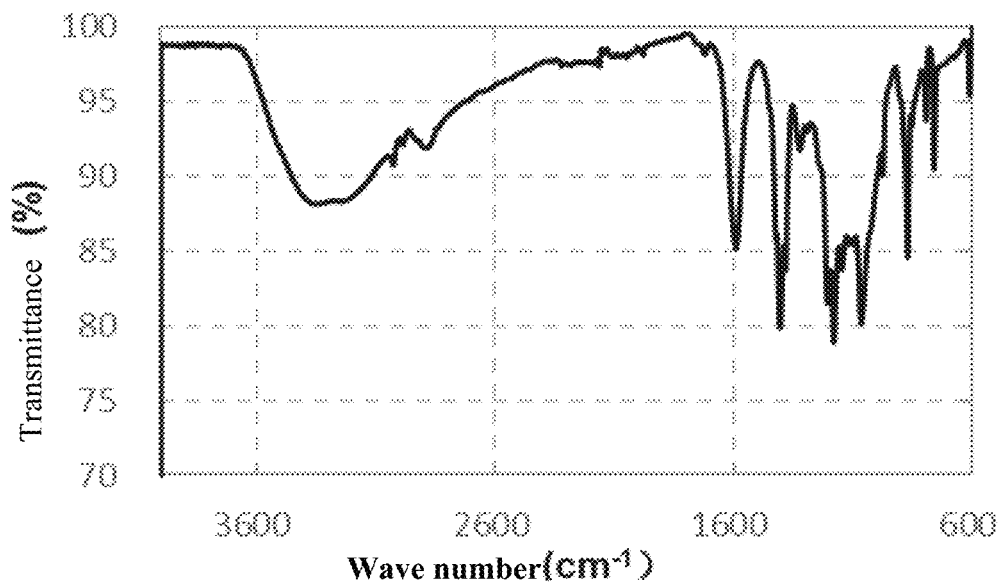
FIG. 1 is an infrared spectrum of a binder compound prepared in Example 1.

1 battery pack; 2 upper box; 3 lower box; 4 battery module; 5 secondary battery; 51 case; 52 electrode assembly; 53 top cover assembly.

DETAILED DESCRIPTION

A binder compound, a method for preparing the same, as well as an electrode sheet, a secondary battery, a battery, a battery pack, and an electrical apparatus comprising the binder compound in the present application are specifically disclosed in detail below appropriately with reference to the detailed description of the drawings. However, there will be cases where unnecessary detailed descriptions are omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if the ranges of 60-120 and 80-110 are listed for a particular parameter, it is understood that the ranges of 60-110 and 80-120 are also contemplated. Additionally, if the minimum range values 1 and 2 are listed, and if the maximum range values 3, 4 and 5 are listed, the following ranges are all contemplated: 1-3, 1-4, 1-5, 2-3, 2-4 and 2-5.

In the present application, unless stated otherwise, the numerical range "a-b" represents an abbreviated representation of any combination of real numbers between a to b, wherein both a and b are real numbers. For example, the numerical range "0-5" means that all real numbers between "0-5" have been listed herein, and "0-5" is just an abbreviated representation of the combination of these numerical values. Additionally, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, the method includes steps (a) and (b), meaning that the method may include steps (a) and (b) performed sequentially, or may include steps (b) and (a) performed sequentially. For example, the reference to the method may further comprise step (c), meaning that step (c) may be added to the method in any order, for example, the method may comprise steps (a), (b) and (c), or may comprise steps (a), (c) and (b), or may comprise steps (c), (a) and (b), and so on.

Unless otherwise specified, the terms "include/including" and "comprise/comprising" mentioned in the present application may be open-ended or closed-ended. For example, the "including" and "comprising" may indicate that it is possible to include or comprise other components not listed, and it is also possible to include or comprise only the listed components.

Unless otherwise specified, the term "or" is inclusive in the present application. By way of example, the phrase "A or B" means "A, B, or both A and B". More specifically, the condition "A or B" is satisfied under any one of the following conditions: A is true (or present) and B is false (or absent); A is false (or absent) and B is true (or present); or both A and B are true (or present).

With the application of lithium-ion batteries to various energy storage power systems in many fields, higher requirements are also put forward for performance of the lithium-ion batteries in various aspects. Generally, performance of a lithium-ion battery will be affected by many factors, such as a service condition of the battery, an electrode sheet of a battery cell, an electrolyte solution, and a separator.

As for the electrode sheet, both binding force and conductivity of the electrode sheet will affect a capacity retention rate of the battery. On the one hand, a binding force of a binder of the electrode sheet is low or decreases (for example, caused by aging), so that some active materials in an electrode sheet material layer no longer function because of failure to communicate with a current collector, thus resulting in battery cell capacity losses and capacity retention rate decrease. On the other hand, the battery cell capacity functioning is also significantly affected by the conductivity of the electrode sheet. If the electrode sheet has good conductivity and low battery polarization, the battery has high efficiency and high capacity retention rate.

Therefore, as an important component in the preparation of a lithium-ion secondary battery, the binder has become a research hot spot in this field.

At present, binders commonly used in this field can be divided into two major categories: water-based (water-soluble) binders and oil-based (water-insoluble) binders. The oil-based binder represented by polyvinylidene fluoride (PVDF) has good binding property, chemical stability, and thermodynamic stability, but its water insolubility leads to the necessity of using an organic solvent, which has high production costs, and is not environmentally friendly. However, the water-based binder represented by sodium carboxymethyl cellulose (CMC-Na) has an inferior binding property to the oil-based binder and has no swelling property, despite that it is economical and environmentally friendly because of using water as a solvent, thereby resulting in large impedance of the electrode sheet, and poor capacity retention rate of the battery.

Therefore, there is a need in this field for an ideal binder that can have advantages of both the oil-based binder and the water-based binder. That is to say, the binder should have at least one of the properties, such as water solubility, good binding property, stable chemical property, and swellability. Based on this original intention, the inventors of the present application has prepared the binder compound of formula (I) in the present application.

A Binder Compound and a Method for Preparing the Same

A first aspect of the present application provides a binder compound of formula (I):

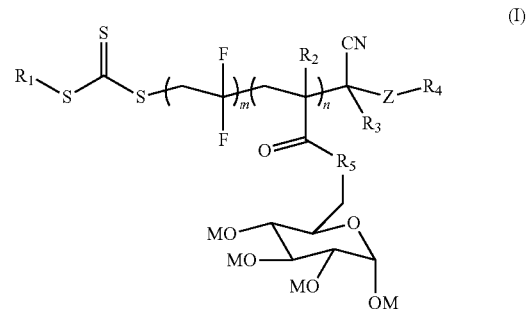

(I)

wherein $R_1$, $R_2$, and $R_3$ each independently represents an unsubstituted or substituted linear or branched alkyl with 1-6 carbon atoms, or an unsubstituted or substituted aryl with 6-20 carbon atoms, $R_4$ represents —COOM;

$R_5$ represents a bridging oxo or bridging imino;

each M independently represents one of Li, Na, K, Rb, and Cs;

Z represents a linear or branched alkylene with 1-6 carbon atoms;

m is an integer selected from 7,600 to 47,000;

n is an integer selected from 1,520 to 94,000; and m/n=0.1-10.

Although the mechanism is not yet clear, the inventors found that: the binder compound of the present application not only has good binding property, stable chemical property, and swellability like PVDF (that is, it will swell after absorbing an electrolyte solution), but also has good water solubility, and therefore can be used for preparing an electrode sheet with water as a solvent. Further, the inventors further found that compared with other water-soluble binders in the prior art, the electrode sheet prepared using the binder compound of formula (I) in the present application has improved ion conductance and reduced polarization; and a secondary battery comprising such an electrode sheet has lower internal resistance of a battery cell and better capacity retention performance (i.e., at least one of the large-rate discharge capacity retention rate and cycling capacity retention rate of the battery is improved).

In some embodiments, in formula (I), $R_1$ and $R_3$ each independently represents an unsubstituted linear or branched alkyl with 1-6 carbon atoms; and optionally, $R_1$ and $R_3$ each independently represents an unsubstituted linear alkyl with 1-6 carbon atoms.

In some embodiments, in formula (I), $R_2$ represents an unsubstituted linear or branched alkyl with 1-6 carbon atoms or phenyl; and optionally, $R_2$ represents an unsubstituted linear alkyl with 1-6 carbon atoms or phenyl.

In some embodiments, in formula (I), optionally, $R_5$ represents bridging oxo.

In some embodiments, in formula (I), optionally, each M independently represents one of Li, Na, and K; and more optionally, each M independently represents Li or Na.

As mentioned above, a structure of the binder compound of formula (I) is further selected, to further improve its binding property, dispersibility (i.e., full dispersion in the preparation of a slurry), etc., and further improve binding effects.

In some embodiments, in formula (I), m is an integer selected from 7,600 to 30,000.

In some embodiments, in formula (I), n is an integer selected from 1,520-46,000; and optionally, n is an integer selected from 1,520-18,000.

In some embodiments, in formula (I), m/n=0.3-7.5; and optionally, m/n=0.5-7.5.

As mentioned above, m, n, and m/n are further selected, to further improve the binding property, swellability, and chemical stability of the binder compound, thereby improving conductivity of electrode sheets, reducing the polarization, and improving performance of the secondary battery.

Particularly, m and n are controlled within the above range respectively, and the ratio m/n therebetween is controlled within the above range, such that contents of and a proportional relation between polyvinylidene fluoride-like (PVDF) polymerization monomer and carboxymethyl cellulose salt-like polymerization monomer in the binder compound can be appropriate, so that the binder compound can not only have good binding property, chemical stability, and enough swellability, but also have good water solubility, and so that the obtained electrode sheet has high ion conductivity and low polarization, thereby improving battery cell performance. At the same time, m, n, and m/n are controlled within the above range, such that the binder compound of the present application has processability, i.e., during preparation of an electrode sheet slurry, it can be well dissolved in a solvent water, allowing to adjust a solid content of the slurry to an ideal range, such that the obtained slurry is more conducive to subsequent operations, such as electrode sheet coating and drying.

In some embodiments, in the binder compound of formula (I), polyvinylidene fluoride-like (PVDF) polymerization monomer and carboxymethyl cellulose salt (CMC-M)-like polymerization monomer are block copolymerized.

Herein, the polyvinylidene fluoride (PVDF)-like polymerization monomer is as shown in the following formula (A):

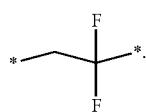

(A)

Herein, the carboxymethyl cellulose salt (CMC-M. M is an alkali metal ion)-like polymerization monomer is as shown in the following formula (B):

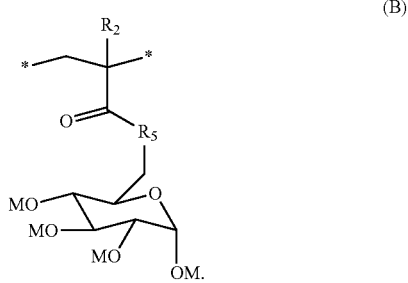

(B)

In the above formulas (A) and (B), * represents a position where a chemical bond is connected to other polymerization monomers.

The second aspect of the present application provides a method for preparing a binder compound of formula (I):

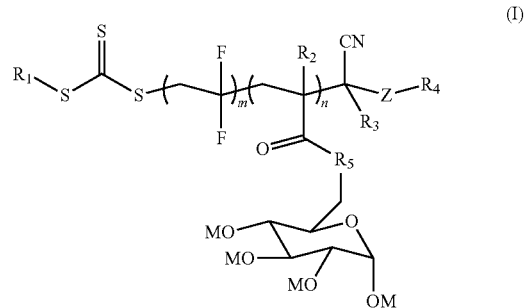

(I)

wherein $R_1$, $R_2$, and $R_3$ each independently represents an unsubstituted or substituted linear or branched alkyl with 1-6 carbon atoms, or an unsubstituted or substituted aryl with 6-20 carbon atoms;

$R_4$ represents —COOM;

$R_5$ represents a bridging oxo or bridging imino;

each M independently represents one of Li, Na, K, Rb, and Cs;

Z represents a linear or branched alkylene with 1-6 carbon atoms;

m is an integer selected from 7,600 to 47,000;

n is an integer selected from 1,520 to 94,000; and m/n=0.1-10.

The method includes the following steps:

(i) allowing a polymerization reaction of a vinylidene fluoride monomer in the presence of a chain transfer agent of formula (II) to obtain a polymer of formula (III).

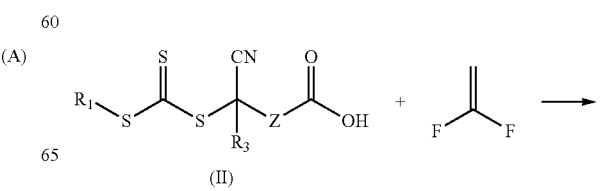

(II)

-continued

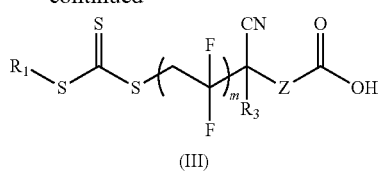

(III)

wherein $R_1$, $R_3$, Z, and m are defined as above respectively.

(ii) allowing a polymerization reaction between a glucose acrylic acid derivative of formula (IV) and polyvinylidene fluoride of formula (III) to obtain a polymer of formula (I'):

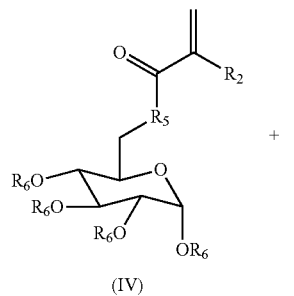

(IV)

+

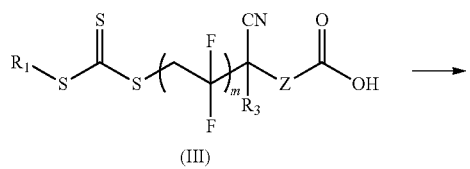

(III)

→

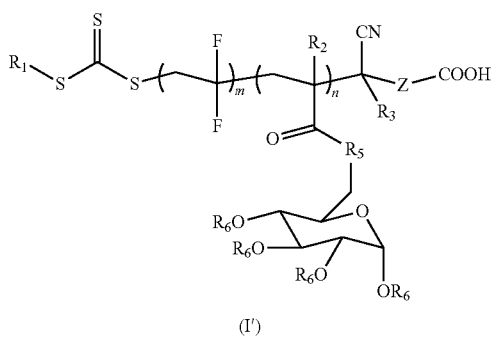

(I')

wherein $R_1$, $R_2$, $R_3$, Z, m, n, and m/n are as defined above,
$R_5$ represents a bridging oxo or bridging imino, and
$R_6$ represents acetyl;

and (iii) reacting the polymer obtained in the step (ii) with an alkali metal alkoxide $R_7OM$ to obtain the binder compound of formula (I):

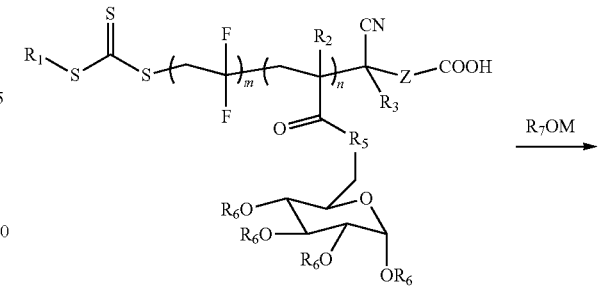

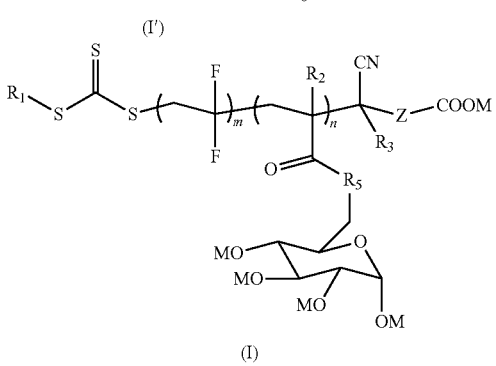

(I)

wherein $R_7$ is selected from a linear or branched alkyl with 1-6 carbon atoms, and is optionally selected from methyl or ethyl.

The binder compound of the present application is prepared using the above preparation method.

In the above method, amounts of the chain transfer agent, vinylidene fluoride monomer, and glucose acrylic acid derivative depend on desired m and n values, and preferably, stoichiometric ratios are adopted.

In some embodiments, in the step (i), optionally, the chain transfer agent of formula (II) is 4-cyano-4-thioylthiopropylsulfanyl pentanoic acid (CPP).

In some embodiments, the step (i) is performed in the presence of an initiator. In some embodiments, the initiator is azobisisobutyronitrile (AIBN) or benzoyl peroxide (BPO); and optionally, the initiator is AIBN.

In some implementations, the step (i) is performed in a solvent. In some embodiments, the solvent is selected from tetrahydrofuran (THF), dimethylformamide (DMF), or dimethyl sulfoxide (DMSO); and optionally, the solvent is THF.

In some embodiments, the step (i) is performed by heating; optionally at 60-80° C., more optionally at 65-75° C., and most optionally at 70° C. The reaction temperature is controlled, to control a reaction speed within a desired range, and also contribute to reducing side reactions.

In some implementations, the step (i) is performed in the absence of oxygen. Optionally, the step (i) is performed in an inert atmosphere; and more optionally, the step (i) is performed in a nitrogen ($N_2$) atmosphere. The reaction in the absence of oxygen can prevent a free radical generated in the reaction from being oxidized, thus inhibiting generation of by-products.

In some embodiments, the step (i) further includes a step of treating an obtained polymer, including, but not limited to, precipitating the obtained polymer with glacial diethyl ether.

In some implementations, the step (ii) is performed in a solvent. In some embodiments, the solvent is selected from THF, DMF, or DMSO; and optionally, the solvent is THF.

In some embodiments, the step (ii) is performed by heating: optionally at 60-80° C., more optionally at 65-75° C., and most optionally at 70° C. The reaction temperature is controlled, thereby controlling the reaction speed within the desired range, and contributing to reducing the side reactions.

In some implementations, the step (ii) is performed in the absence of oxygen. Optionally, the step (ii) is performed in an inert atmosphere; and more optionally, the step (ii) is performed in a nitrogen ($N_2$) atmosphere. The reaction in the absence of oxygen can prevent a free radical generated in the reaction from being oxidized, thus inhibiting generation of by-products.

In some embodiments, the step (ii) further includes the step of treating the obtained polymer, including, but not limited to, precipitating the obtained polymer with glacial diethyl ether.

In one embodiment, the $R_6$ represents a protective group. Those skilled in the art can conventionally select an appropriate protective reagent to protect 1-secondary hydroxyl to 4-secondary hydroxyl of a ring structure of glucose or 6-aminoglucose, so as to avoid interfering with a desired reaction (a reaction between 6-primary hydroxyl or primary amino and acyl chloride in the present application). Depending on the employed protective reagent, $R_6$ may be any appropriate protective group known in the art, including, but not limited to, acetyl.

In some implementations, the step (iii) is performed in a solvent. In some embodiments, the solvent is THF or an alcohol (e.g., methanol or ethanol).

In some embodiments, in the step (iii), the alkali metal alkoxide ($R_7OM$) is a commonly used alkali metal alkoxide in the art. Optionally, in the $R_7OM$, $R_7$ is selected from methyl or ethyl, i.e., the alkali metal alkoxide is selected from an alkali metal methoxide or an alkali metal ethoxide. The above alkali metal alkoxide is selected, to provide an alkaline environment required for the reaction.

In some embodiments, the step (iii) is performed at normal temperature, optionally at 20-30° C., more optionally at 22-28° C., and most optionally at 25° C.

In some embodiments, the step (iii) further includes purifying the final product, where the purification is performed by, for example, but not limited to, dialysis.

In some embodiments, in the method of the present application, the glucose acrylic acid derivative of formula (IV) is commercially available or is obtained by a synthetic method known to those skilled in the art.

In some embodiments, the glucose acrylic acid derivative of formula (IV) is obtained from glucose or 6-aminoglucose by:

(1) reacting glucose or 6-aminoglucose with a first protective reagent, so that 6-primary hydroxyl or primary amino thereof is protected by a first protective group;

(2) reacting the product in the step (1) with acetic anhydride, so that 1-hydroxyl to 4-hydroxyl thereof are protected by acetyl;

(3) removing the first protective group from the product in the step (2); and (4) reacting the product in the step (3) with acryloyl chloride or a derivative thereof to obtain the glucose acrylic acid derivative of formula (IV).

In some embodiments, the first protective reagent is any selective primary hydroxyl protective reagent or selective primary amino protective agent known in the art. In some embodiments, the first protective reagent is triphenylchoromethane; and correspondingly, the first protective group is triphenylmethyl.

In some embodiments, tritylation reaction in the step (1) is performed by heating optionally at 75-85° C., and more optionally at 80° C. The reaction temperature is controlled within the above range, thereby effectively reducing occurrence of side reactions on the premise of keeping a good reaction rate.

In some embodiments, acylation reaction in the step (2) is performed at room temperature, optionally at 20-25° C., and more optionally at 22° C.

In some embodiments, the protective reagent acetic anhydride may also be replaced with any protective reagent suitable for hydroxyl protection known in the art. In the present disclosure, acetic anhydride is used as a protective reagent for 1-hydroxyl to 4-hydroxyl of glucose, to achieve better protective effects.

In some embodiments, after 1-secondary hydroxyl to 4-secondary hydroxyl in a glucose molecule of formula (V) is protected by acetyl, 6-group is deprotected to expose the primary hydroxyl for subsequent reactions. In some embodiments, the step (3) is performed under any condition suitable for removing the primary hydroxyl protective group known in the art. In some embodiments, the step (3) is performed under an acidic condition, and optionally in the presence of HBr. In some embodiments, detritylation reaction in the step (3) is performed at −5-5° C., and optionally at 0° C.

In some embodiments, the step (4) is performed in the presence of a catalyst. Optionally, the catalyst is triethylamine.

In some embodiments, the step (4) is performed at normal temperature, optionally at 20-30° C., more optionally at 22-28° C., and most optionally at 25° C.

In some implementations, each of the steps (1)-(4) is independently performed in a same solvent or in different solvents. Optionally, the steps (1)-(4) are performed in a solvent pyridine.

In some embodiments, the glucose acrylic acid derivative of formula (IV) is obtained through the following reaction route of glucose of formula (V) and acryloyl chloride or a derivative thereof:

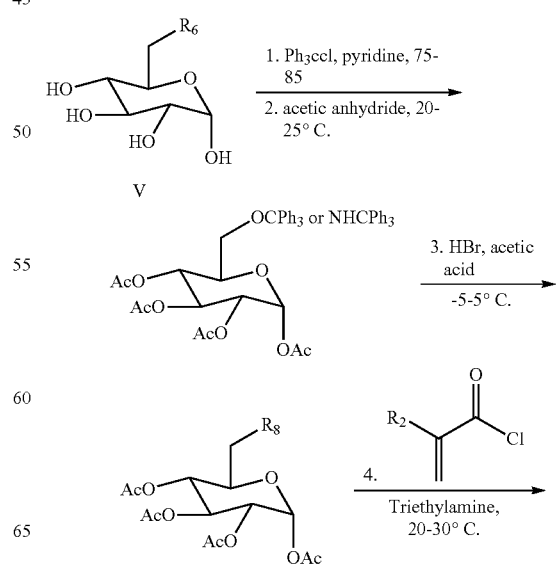

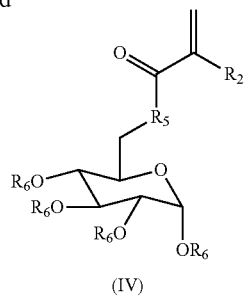

(IV)

wherein $R_2$, $R_5$, $R_6$, and $R_8$ are as defined above respectively.

A method for preparing a glucose acrylic acid derivative of formula (IV) is provided above. Further, reaction conditions are further selected, thereby favorably controlling occurrence of side reactions, and guaranteeing purity of synthetic products, on the premise of keeping a good reaction rate.

Electrode Sheet

The third aspect of the present application provides an electrode sheet, comprising a current collector and an electrode sheet material layer provided on at least one surface of the current collector, wherein the electrode sheet material layer comprises the binder compound in the first aspect of the present application or the binder compound prepared using the preparation method in the second aspect of the present application.

[Negative Electrode Sheet]

In some embodiments, the electrode sheet is a negative electrode sheet. In some embodiments, the negative electrode sheet comprises a negative electrode current collector and a negative electrode material layer provided on at least one surface of the negative electrode current collector, wherein the negative electrode material layer comprises the binder compound in the first aspect of the present application or the binder compound prepared using the preparation method in the second aspect of the present application.

In some embodiments, the electrode sheet material layer of the negative electrode sheet comprises 0.1-10 wt %, optionally 0.5-3 wt %, of the binder compound based on a total weight of the electrode sheet material layer. A percentage content of the binder compound comprised in the negative electrode material layer is controlled within the above range, so as to ensure good binding effects of the binder compound therein (i.e., the electrode sheet material layer is difficult to have powder falling off, etc.), so that the electrode sheet has low resistance and low polarization, thereby effectively improving at least one of the large-rate discharge capacity retention rate (for example, 4C capacity retention rate) and cycling capacity retention rate of the battery. At the same time, the content of the binder compound comprised in the electrode sheet material layer is limited, to ensure that the electrode sheet comprises enough active materials, so that the obtained battery cell has desired energy density.

As an example, the negative electrode current collector has two surfaces opposite in its own thickness direction, and the negative electrode material layer is arranged on either one or both of the two opposite surfaces of the negative electrode current collector.

In some embodiments, the negative electrode current collector can be a metal foil or a composite current collector. For example, a copper foil can be used as the metal foil. The composite current collector may comprise a high molecular material substrate layer and a metal layer formed on at least one surface of a high molecular material substrate layer. The composite current collector may be formed by forming a metal material (such as copper, copper alloy, nickel, nickel alloy, titanium, titanium alloy, silver, and silver alloy) on a base material of a high molecular material (such as a base material of polypropylene (PP), polyethylene terephthalate (PET), polybutylene terephthalate (PBT), polystyrene (PS), or polyethylene (PE)).

In some embodiments, an electrode sheet material laver of a negative electrode further comprises a negative electrode active material. A negative electrode active material for a battery well-known in the art may be used as the negative electrode active material. As an example, the negative electrode active material may include at least one of the following materials: artificial graphite, natural graphite, soft carbon, hard carbon, silicon-based material, tin-based material, lithium titanate, and the like. The silicon-based material may be at least one selected from the group consisting of elementary silicon, silicon-oxygen compound, silicon-carbon composite, silicon-nitrogen composite, and silicon alloy. The tin-based material may be at least one selected from the group consisting of elementary tin, tin-oxygen compound, and tin alloy. However, the present application is not limited to these materials, and other conventional materials useful as negative electrode active materials for batteries can also be used. These negative electrode active materials may be used alone or in combination of two or more thereof.

In some embodiments, the electrode sheet material layer of the negative electrode further optionally comprises other binders. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the electrode sheet material layer of the negative electrode further optionally comprises a conductive agent. The conductive agent may be selected from at least one of superconducting carbon, acetylene black, carbon black, Ketjen black, carbon dot, carbon nanotube, graphene, and carbon nanofiber.

In some embodiments, the electrode sheet material layer of the negative electrode further optionally comprises other adjuvants, for example, a thickener (such as sodium carboxymethyl cellulose (CMC-Na)).

In some embodiments, the negative electrode sheet may be prepared as follows: the above ingredients, such as the negative electrode active material, the conductive agent, the binder, and any other ingredient, for preparing the negative electrode sheet are dispersed in a solvent (such as deionized water) to form a negative electrode slurry; and the negative electrode slurry is coated on the negative electrode current collector, dried, and cold pressed, to obtain the negative electrode sheet.

[Positive Electrode Sheet]

In some embodiments, the electrode sheet of the present application is a positive electrode sheet. The positive electrode sheet comprises a positive electrode current collector and a positive electrode material layer arranged on at least one surface of the positive electrode current collector, and the positive electrode material layer comprises the positive electrode active material in the first aspect of the present application. The positive electrode material layer comprises the binder compound in the first aspect of the present application or the binder compound prepared using the preparation method in the second aspect of the present application.

In some embodiments, the positive electrode sheet comprises the binder compound in the first aspect of the present application or the binder compound prepared using the preparation method in the second aspect of the present application in an amount that is enough to achieve desired binding effects.

As an example, the positive electrode current collector has two surfaces opposite in its own thickness direction, and the positive electrode material layer is arranged on either one or both of the two opposite surfaces of the positive electrode current collector.

In some embodiments, the positive electrode current collector can be a metal foil or a composite current collector. For example, an aluminum foil can be used as the metal foil. The composite current collector can comprise a high molecular material substrate layer and a metal layer formed on at least one surface of the high molecular material substrate layer. The composite current collector may be formed by forming a metal material (such as aluminum, aluminum alloy, nickel, nickel alloy, titanium, titanium alloy, silver, and silver alloy) on a base material of a high molecular material (such as a base material of polypropylene (PP), polyethylene terephthalate (PET), polybutylene terephthalate (PBT), polystyrene (PS), or polyethylene (PE)).

In some embodiments, the positive electrode active material may be a positive electrode active material for batteries well known in the art. As an example, the positive electrode active material may include at least one of the following materials: a lithium-containing phosphate of olivine structure, a lithium transition metal oxide, and a respective modified compound thereof. However, the present application is not limited to these materials, and other conventional materials useful as positive electrode active materials for batteries can also be used. These positive electrode active materials may be used alone or in combination of two or more thereof. Among them, examples of lithium transition metal oxides may include, but are not limited to, at least one of a lithium-cobalt oxide (such as $LiCoO_2$), a lithium-nickel oxide (such as $LiNiO_2$), a lithium-manganese oxide (such as $LiMnO_2$ or $LiMn_2O_4$), a lithium-nickel-cobalt oxide, a lithium-manganese-cobalt oxide, a lithium-nickel-manganese oxide, a lithium-nickel-cobalt-manganese oxide (such as $LiNi_{1/3}Co_{1/3}Mn_{1/3}O_2$ (also abbreviated as $NCM_{333}$), $LiNi_{0.5}Co_{0.2}Mn_{0.3}O_2$ (also abbreviated as $NCM_{523}$), $LiNi_{0.5}Co_{0.25}Mn_{0.25}O_2$ (also abbreviated as $NCM_{211}$), $LiNi_{0.6}Co_{0.2}Mn_{0.2}O_2$ (also abbreviated as $NCM_{622}$), $LiNi_{0.8}Co_{0.1}Mn_{0.1}O_2$ (also abbreviated as $NCM_{811}$)), a lithium-nickel-cobalt-aluminum oxide (such as $LiNi_{0.85}Co_{0.15}Al_{0.05}O_2$), and a modified compound thereof. Examples of the lithium-containing phosphate of olivine structure may include, but are not limited to, at least one of lithium iron phosphate (such as $LiFePO_4$ (also abbreviated as LFP)), a composite material of lithium iron phosphate and carbon, lithium manganese phosphate (such as $LiMnPO_4$), a composite material of lithium manganese phosphate and carbon, lithium iron manganese phosphate, and a composite material of lithium manganese iron phosphate and carbon.

In some embodiments, the positive electrode material layer further optionally comprises other binders. As an example, the binder may comprise at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluoroacrylate resin.

In some embodiments, the positive electrode material layer further optionally comprises a conductive agent. As an example, the conductive agent may comprise at least one of superconducting carbon, acetylene black, carbon black, Ketjen black, carbon dot, carbon nanotube, graphene, and carbon nanofiber.

In some embodiments, the positive electrode sheet may be prepared as follows: the above ingredients, such as the positive electrode active material, the conductive agent, the binder, and any other ingredient, for preparing the positive electrode sheet are dispersed in an appropriate solvent (such as water or N-methyl pyrrolidone) to form a positive electrode slurry; and the positive electrode slurry is coated on the positive electrode current collector, dried, and cold pressed, to obtain the positive electrode sheet.

A Secondary Battery, a Battery Module, a Battery Pack, and an Electrical Apparatus The fourth aspect of the present application provides a secondary battery, comprising the binder compound provided in the first aspect of the present application, or the binder compound obtained using the preparation method provided in the second aspect of the present application, or the electrode sheet provided in the third aspect of the present application.

In some embodiments, the secondary battery is a lithium-ion secondary battery.

The fifth aspect of the present application provides a battery module, comprising the secondary battery in the fourth aspect of the present application.

The sixth aspect of the present application provides a battery pack, comprising the battery module in the fifth aspect of the present application.

The seventh aspect of the present application provides an electrical apparatus, comprising at least one selected from the secondary battery in the fourth aspect of the present application, the battery module in the fifth aspect of the present application, or the battery pack in the sixth aspect of the present application.

In addition, the secondary battery, the battery module, the battery pack, and the electrical apparatus in the present application are described below appropriately with reference to the drawings.

In general, the secondary battery comprises a positive electrode sheet, a negative electrode sheet, an electrolyte, and a separator. During charging and discharging of the battery, active ions are intercalated and deintercalated back and forth between the positive electrode sheet and the negative electrode sheet. The electrolyte serves to conduct ions between the positive electrode sheet and the negative electrode sheet. The separator is provided between the positive electrode sheet and the negative electrode sheet, and mainly functions to prevent a short circuit between the positive electrode and the negative electrode while allowing ions to pass through.

[Electrolyte]

The electrolyte serves to conduct ions between the positive electrode sheet and the negative electrode sheet. The type of the electrolyte is not particularly limited in the present application, and can be selected according to requirements. For example, the electrolyte may be in a liquid, gel, or full solid state.

In some embodiments, an electrolyte solution is used as the electrolyte. The electrolyte solution comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalato)borate, lithium bis(oxalate)borate, lithium difluoro bis(oxalato)phosphate, and lithium tetrafluoro(oxalato)phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolyte solution further optionally comprises an additive. For example, the additive may include a negative electrode film-forming additive or a positive electrode film-forming additive, or may further include an additive that can improve some performance of the battery, such as an additive that improves overcharge performance of the battery or an additive that improves high-temperature or low-temperature performance of the battery.

[Separator]

In some embodiments, the secondary battery further comprises a separator. The type of the separator is not particularly limited in the present application, and any well-known separator with a porous structure having good chemical stability and mechanical stability may be selected.

In some embodiments, the material of the separator may be selected from at least one of glass fiber, non-woven cloth, polyethylene, polypropylene, and polyvinylidene fluoride. The separator may be a single-layer film or a multi-layer composite film, and is not particularly limited. When the separator is a multilayer composite film, the material in each layer may be identical or different, which is not particularly limited.

In some embodiments, the positive electrode sheet, the negative electrode sheet, and the separator may be made into an electrode assembly by a winding process or a lamination process.

In some embodiments, the secondary battery may comprise an outer package. The outer package can be used to encapsulate the above-mentioned electrode assembly and electrolyte.

In some embodiments, the outer package of the secondary battery may be a hard case, such as a hard plastic case, an aluminum case, a steel case, and the like. The outer package of the secondary battery may also be a soft pack, such as a bag-type soft pack. The material of the soft pack may be a plastic, and examples of the plastic include polypropylene, polybutylene terephthalate and polybutylene succinate, etc.

Figure 2:
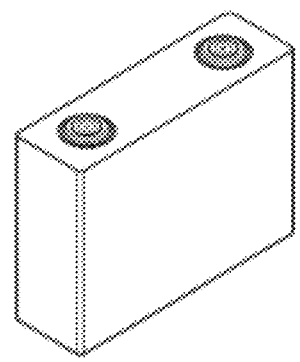
FIG. 2 is a schematic diagram of a secondary battery according to an embodiment of the present application.

The shape of the secondary battery is not particularly limited in the present application, and may be a cylinder, a square, or any other shape. For example, FIG. 2 shows an example of a secondary battery 5 having a square structure.

Figure 3:
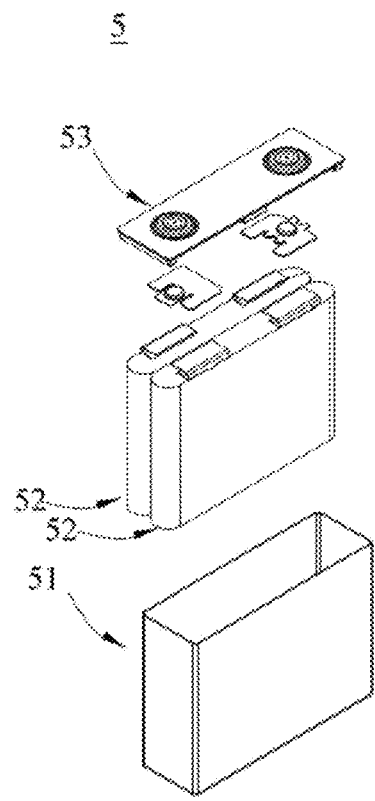
FIG. 3 is an exploded view of the secondary battery according to an embodiment of the present application shown in FIG. 2.

In some embodiments, referring to FIG. 3, the outer package may include a case 51 and a cover plate 53. Here, the case 51 can include a bottom plate and a side plate connected to the bottom plate, with the bottom plate and the side plate enclosing to form an accommodating cavity. The shell 51 has an opening that communicates with the accommodating cavity, and the cover plate 53 can cover the opening to close the accommodating cavity. The positive electrode sheet, the negative electrode sheet, and the separator may form an electrode assembly 52 by a winding process or a lamination process. The electrode assembly 52 is encapsulated within the accommodating cavity. The electrolyte solution impregnates the electrode assembly 52. The number of electrode assemblies 52 comprised in the secondary battery 5 may be one or more, and may be selected by those skilled in the art according to specific actual requirements.

In some embodiments, the secondary batteries may be assembled into a battery module, the number of secondary batteries comprised in the battery module may be one or more, and the specific number may be selected by those skilled in the art based on the application and capacity of the battery module.

Figure 4:
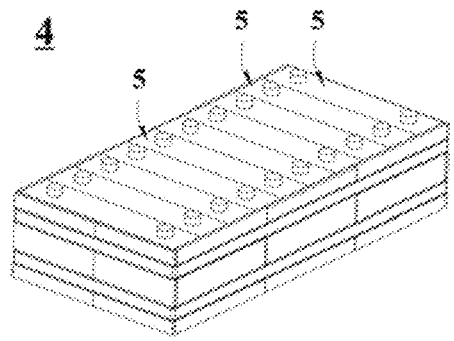
FIG. 4 is a schematic diagram of a battery module according to an embodiment of the present application.

FIG. 4 is a battery module 4 as an example. Referring to FIG. 4, in the battery module 4, a plurality of secondary batteries 5 may be sequentially arranged along a length direction of the battery module 4, and of course, may also be arranged in any other manner. The plurality of secondary batteries 5 may further be fixed by fasteners.

Optionally, the battery module 4 may further include a shell having an accommodating space, in which the plurality of secondary batteries 5 are accommodated.

In some embodiments, the battery modules may be further assembled into a battery pack, the number of battery modules comprised in the battery pack may be one or more, and the specific number may be selected by those skilled in the art based on the application and capacity of the battery pack.

Figure 5:
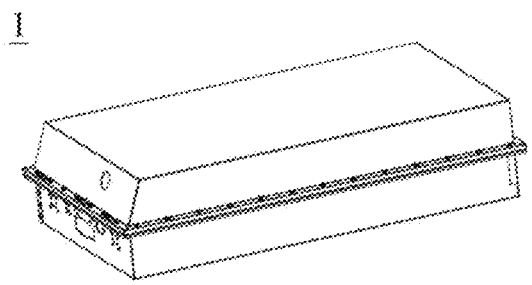
FIG. 5 is a schematic diagram of a battery pack according to an embodiment of the present application.
Figure 6:
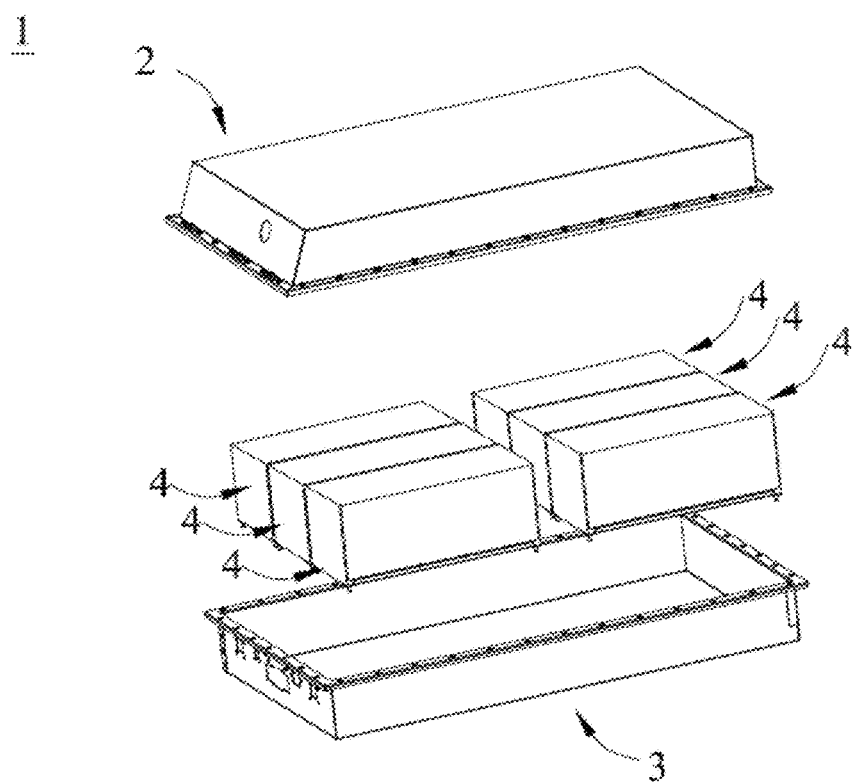
FIG. 6 is an exploded view of the battery pack according to an embodiment of the present application shown in FIG. 5.

FIG. 5 and FIG. 6 are a battery pack 1 as an example. Referring to FIGS. 5 and 6, the battery pack 1 may include a battery box and multiple battery modules 4 disposed in the battery box. The battery box includes an upper box 2 and a lower box 3, where the upper box 2 can cover the lower box 3 and forms an enclosed space for accommodating the battery module 4. The plurality of battery modules 4 may be arranged in the battery box in any manner.

Additionally, the present application further provides an electrical apparatus comprising at least one of the secondary battery, battery module or battery pack provided in the present application. The secondary battery, battery module, or battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, and an energy storage system, etc.

For the electrical apparatus, the secondary battery, the battery module, or the battery pack can be selected according to the requirements during use.

Figure 7:
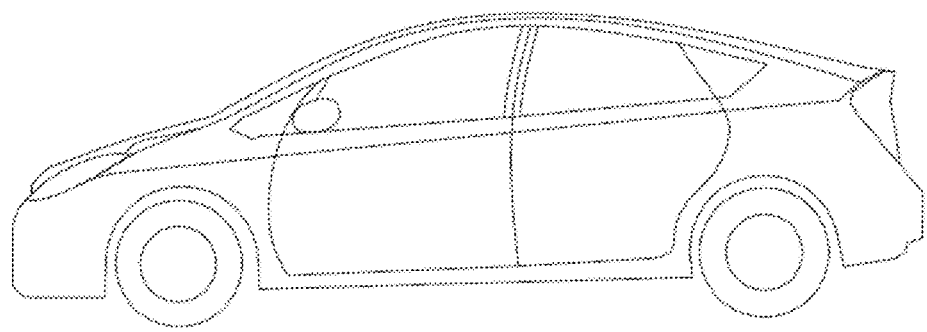
FIG. 7 is a schematic diagram of an electrical apparatus using a secondary battery as a power source according to an embodiment of the present application.

FIG. 7 shows an electrical apparatus as an example. The electrical apparatus is an all-electric vehicle, a hybrid electric vehicle, or a plug-in hybrid electric vehicle, etc. In order to meet the requirements of the electrical apparatus for high power and high energy density of secondary batteries, a battery pack or a battery module may be used.

As another example, the apparatus may be a mobile phone, a tablet, a laptop, etc. The apparatus is generally required to be light and thin, and may use a secondary battery as a power source.

EXAMPLES

Examples of the present application will be described below. The examples described below are illustrative, are merely used to explain the present application, and should not be construed as limitation on the present application. Where specific techniques or conditions are not specified in the examples, the techniques or conditions described in literatures of the art or the product specifications are followed. Where manufacturers are not specified, the reagents or instruments used are conventional products and are commercially available.

Example 1

[Preparation of a Binder]

(1) In a three-necked flask, 6.5 g of a vinylidene fluoride monomer and 2 mg of a chain transfer agent (CPP) were added, and dissolved in 200 mL of tetrahydrofuran. The flask was vacuumized, and then $N_2$ was continuously insufflated. 0.05 g of an initiator azobisisobutyronitrile was added. The mixture was heated to 70° C., kept at 70° C., and stirred for reaction for 12 h. Then, the reaction mixture was poured into glacial diethyl ether at 0° C. for precipitation. The mixture was filtered and dried to provide solid powder A.

(2) At room temperature, 72 g of glucose (CAS: 492-62-6) was weighed, and added into 50 mL of a solvent pyridine. 28 g of triphenylchloromethane was added. The mixture was heated to 80° C., and kept at this temperature for reaction for 30 min, to obtain glucose with tritylated 6-hydroxyl, which was filtered, washed, and dried, to obtain a solid 1. Then, all of the solid 1 was added into 20 g of acetic anhydride for reaction at 22° C. for 12 h, to obtain glucose with acetylated 1-hydroxyl to 4-hydroxyl, which was filtered, washed, and dried, to obtain a solid 2. Then, all of the solid 2 was added into 20 mL of 45% hydrogen bromide solution in acetic acid for reaction at 0° C. for 10 min, to remove the 6-protective group. Then, 10 mL of a catalyst triethylamine and 42 g of methacryloyl chloride (CAS: 920-46-7) were added into the above reaction system for reaction at 25° C. for 24 h, and the mixture was dried to provide the glucose acrylic acid derivative with acetylated 1-hydroxyl to 4-hydroxyl, i.e., solid powder B.

(3) 100 g of the solid powder A and 92 g of the solid powder B were weighed, mixed, and then dissolved in 500 mL of tetrahydrofuran present in a three-necked flask, which was vacuumized. Under the condition that $N_2$ was continuously insufflated, 0.05 g of an initiator azobisisobutyronitrile was added into the above three-necked flask, and then the mixture was heated to 70° C. The mixture was stirred at 70° C. for reaction for 12 h. Then, the reaction mixture was poured into glacial diethyl ether at 0° C. for precipitation. The mixture was filtered and dried to provide white solid powder.

(4) The white solid powder obtained in the step (3) was dissolved in 2 (0 mL of tetrahydrofuran, into which 10.8 g of 30% sodium methoxide solution in methanol was dropwise added, and the mixture was stirred at 25° C. for 3 h. After the reaction was completed, the reaction product was concentrated using a rotary evaporator, and then the concentrated reaction product was transferred to a dialysis bag with a molecular weight of 10,000 for dialysis for 24 h to purify the product. The purified product was freeze-dried to provide the binder compound of the present application.

[Preparation of a Negative Electrode Sheet]

An active material artificial graphite, a conductive agent carbon black, and the binder compound prepared above at a weight ratio of 96:2:2 were dissolved in deionized water. The solution was sufficiently mixed to prepare a negative electrode slurry with a solid content of 55 wt %. The negative electrode slurry was uniformly coated on a negative electrode current collector copper foil at a loading capacity of 12 mg/cm$^2$ once or more than once, dried, cold pressed, and cut, to provide the negative electrode sheet.

[Preparation of a Positive Electrode Sheet]

A positive electrode ternary active material lithium nickel cobalt manganese oxide, a conductive agent carbon black, and a binder polyvinylidene fluoride (PVDF) at a mass ratio of 96:2.5:1.5 were added and sufficiently mixed, and then a solvent N-methyl pyrrolidone (NMP) was added to regulate the solid content to 70 wt %-80 wt %. The mixture was stirred to obtain a positive electrode slurry. Then, the positive electrode slurry was uniformly coated on a positive electrode current collector aluminum foil at a loading capacity of 20 mg/cm$^2$, and then dried, cold pressed, and cut, to provide the positive electrode sheet.

[Preparation of an Electrolyte Solution]

In a glove box under an argon atmosphere, ethylene carbonate (EC)/ethyl methyl carbonate (EMC) at a volume ratio of 3/7 were sufficiently mixed to obtain a solvent. $LiPF_6$ was dissolved in the above solvent at a mass percentage of 12.5%, and the solution was sufficiently stirred to provide the electrolyte solution.

[Separator]

A polypropylene film was used as the separator.

[Preparation of a Lithium-Ion Secondary Battery]

The positive electrode sheet, the separator, and the negative electrode sheet were stacked sequentially, so that the separator was located between the positive electrode sheet and the negative electrode sheet to serve for separation, and then winded to obtain a bare battery cell, which was welded with a tab, loaded into an aluminum shell, and baked at 80° C. to remove water. Then, an electrolyte solution was immediately injected, and the battery cell was sealed, to obtain an uncharged battery. The uncharged battery was then subjected to the processes, such as standing still, hot and cold pressing, formation, shaping, and capacity testing, to provide the lithium-ion battery product.

Example 2

[Preparation of a Binder]

(1) In a three-necked flask, 6.5 g of a vinylidene fluoride monomer and 2 mg of a chain transfer agent (CPP) were added, and dissolved in 200 mL of tetrahydrofuran. The flask was vacuumized, and then $N_2$ was continuously insufflated. 0.05 g of an initiator azobisisobutyronitrile was added. The mixture was heated to 70° C., and stirred at 70° C. for reaction for 12 h. Then, the reaction mixture was poured into glacial diethyl ether at 0° C. for precipitation. The mixture was filtered and dried to provide solid powder A.

(2) At room temperature, 72 g of glucose (CAS: 492-62-6) was weighed, and added into 50 mL of a solvent pyridine. 28 g of triphenylchloromethane was added. The mixture was heated to 80° C., and kept at this temperature for reaction for 30 min, to obtain glucose with tritylated 6-hydroxyl, which was filtered, washed, and dried, to obtain a solid 1. Then, all of the solid 1 was added into 20 g of acetic anhydride for reaction at 22° C. for 12 h, to obtain glucose with acetylated 1-hydroxyl to 4-hydroxyl, which was filtered, washed, and dried, to obtain a solid 2. Then, all of the solid 2 was added into 20 mL of 45% hydrogen bromide solution in acetic acid for reaction at 0° C. for 10 min, to remove the 6-protective group. Then, 10 mL of a catalyst triethylamine and 53 g of propylacryloyl chloride (CAS: 78450-85-8) were added into the above reaction system, and the mixture was dried to provide the glucose acrylic acid derivative with acetylated 1-hydroxyl to 4-hydroxyl, i.e., solid powder B.

(3) 100 g of the solid powder A and 92 g of the solid powder B were weighed, mixed, and then dissolved in 500 mL of tetrahydrofuran present in a three-necked flask, which was vacuumized. Under the condition that $N_2$ was continuously insufflated, 0.05 g of an initiator azobisisobutyronitrile was added into the above three-necked flask, and then the mixture was heated to 70° C. The mixture was stirred at 70° C. for reaction for 12 h. Then, the reaction mixture was poured into glacial diethyl ether at 0° C. for precipitation. The mixture was filtered and dried to obtain white solid powder.

(4) The white solid powder obtained in the step (3) was dissolved in 200 mL of tetrahydrofuran, into which 10.8 g of 30% sodium methoxide solution in methanol was dropwise added, and the mixture was stirred at 25° C. for 3 h. After the stirring was completed, the reaction product was concentrated using a rotary evaporator, and then the concentrated reaction product was transferred to a dialysis bag with a molecular weight of 10,000 for dialysis for 24 h to purify the product. The purified product was freeze-dried to provide the binder compound of the present application.

Other subsequent steps are the same as those in Example 1.

Example 3

[Preparation of a Binder]

(1) In a three-necked flask, 6.5 g of a vinylidene fluoride monomer and 2 mg of a chain transfer agent (CPP) were added, and dissolved in 200 mL of tetrahydrofuran. The flask was vacuumized, and then $N_2$ was continuously insufflated. 0.05 g of an initiator azobisisobutyronitrile was added. The mixture was heated to 70° C., and stirred at 70° C. for reaction for 12 h. Then, the reaction mixture was poured into glacial diethyl ether at 0° C. for precipitation. The mixture was filtered and dried to provide solid powder A.

(2) At room temperature, 20.0 g of glucose (CAS: 492-62-6) was weighed, and added into 50 mL of a solvent pyridine. 28 g of triphenylchloromethane was added. The mixture was heated to 80° C., and kept at this temperature for reaction for 30 min, to protect 6-hydroxyl of a glucose molecule. Then, 20 g of acetic anhydride was added for reaction at 22° C., to protect hydroxyl at other positions. Then, 20 g of 45% hydrogen bromide solution in acetic acid was added for reaction at 0° C. for 10 min, to remove the 6-protective group. Then, 10 mL of a catalyst triethylamine and 12 g of methacryloyl chloride (CAS: 920-46-7) were added into the above reaction system, and the mixture was dried to provide the glucose acrylic acid derivative comprising the protective group, i.e., solid powder B.

(3) 100 g of the solid powder A and 92 g of the solid powder B were weighed, mixed, and then dissolved in 500 mL of tetrahydrofuran present in a three-necked flask, which was vacuumized. Under the condition that $N_2$ was continuously insufflated, 0.05 g of an initiator azobisisobutyronitrile was added into the above three-necked flask, and then the mixture was heated to 70° C. The mixture was stirred at 70° C. for reaction for 12 h. Then, the reaction mixture was poured into glacial diethyl ether at 0° C. for precipitation. The mixture was filtered and dried to provide white solid powder.

(4) The white solid powder obtained in the step (3) was dissolved in 200 mL of tetrahydrofuran, into which 7.6 g of 30% lithium methoxide solution in methanol was dropwise added, and the mixture was stirred at 25° C. for 3 h. After the stirring was completed, the reaction product was concentrated using a rotary evaporator, and then the concentrated reaction product was transferred to a dialysis bag with a molecular weight of 10,000 for dialysis for 24 h to purify the product. The purified product was freeze-dried to provide the binder compound of the present application.

Other subsequent steps are the same as those in Example 1.

Example 4

[Preparation of a Binder]

(1) In a three-necked flask, 6.5 g of a vinylidene fluoride monomer and 2 mg of a chain transfer agent (CPP) were added, and dissolved in 200 mL of tetrahydrofuran. The flask was vacuumized, and then $N_2$ was continuously insufflated. 0.05 g of an initiator azobisisobutyronitrile was added. The mixture was heated to 70° C., and stirred at 70° C. for reaction for 12 h. Then, the reaction mixture was poured into glacial diethyl ether at 0° C. for precipitation. The mixture was filtered and dried to provide solid powder A.

(2) At room temperature, 2.0 g of glucose (CAS: 492-62-6) was weighed, and added into 50 mL of a solvent pyridine. 28 g of triphenylchloromethane was added. The mixture was heated to 80° C., and kept at this temperature for reaction for 30 min, to obtain glucose with tritylated 6-hydroxyl, which was filtered, washed, and dried, to obtain a solid 1. Then, all of the solid 1 was added into 20 g of acetic anhydride for reaction at 22° C. for 12 h, to obtain glucose with acetylated 1-hydroxyl to 4-hydroxyl, which was filtered, washed, and dried, to obtain a solid 2. Then, all of the solid 2 was added into 20 mL of 45% hydrogen bromide solution in acetic acid for reaction at 0° C. for 10 min, to remove the 6-protective group. Then, 10 mL of a catalyst triethylamine and 2 g of β-phenylacryloyl chloride (CAS: 102-92-1) were added into the above reaction system, and the mixture was dried to provide the glucose acrylic acid derivative with acetylated 1-hydroxyl to 4-hydroxyl, i.e., solid powder B.

(3) 100 g of the solid powder A and 92 g of the solid powder B were weighed, mixed, and then dissolved in 500 mL of tetrahydrofuran present in a three-necked flask, which was vacuumized. Under the condition that $N_2$ was continuously insufflated, 0.05 g of an initiator azobisisobutyronitrile was added into the above three-necked flask, and then the mixture was heated to 70° C. The mixture was stirred at 70° C. for reaction for 12 h. Then, the reaction mixture was poured into glacial diethyl ether at 0° C. for precipitation. The mixture was filtered and dried to provide white solid powder.

(4) The white solid powder obtained in the step (3) was dissolved in 200 mL of tetrahydrofuran, 10.8 g of 30% sodium methoxide solution in methanol was dropwise added into the reaction flask, and the mixture was stirred at 25° C. for 3 h. After the reaction was completed, the reaction product was concentrated using a rotary evaporator, and then the concentrated reaction product was transferred to a dialysis bag with a molecular weight of 10,000 for dialysis for 24 h. The purified product was freeze-dried to provide the binder compound of the present application.

Other subsequent steps are the same as those in Example 1.

Examples 5-17

In Examples 5-17, only the addition amounts of the vinylidene fluoride monomer in the step (1), and the solid powder A and the solid powder B in the step (3) in the [preparation of a binder] were regulated, and the other steps are the same as those in Example 1, to provide the binder compound with different m, n, and m/n values. The addition amounts of the vinylidene fluoride monomer, the solid powder A, and the solid powder B in each example are shown in Table 1 below.

TABLE 1

| Examples | Vinylidene fluoride (g) | Solid powder A (g) | Solid powder B (g) |
|---|---|---|---|
| 5 | 6.5 | 100 | 92 |
| 6 | 19.5 | 100 | 92 |
| 7 | 39 | 100 | 92 |
| 8 | 7.3 | 0.5 | 184 |
| 9 | 14.6 | 200 | 29 |
| 10 | 24.4 | 200 | 13 |
| 11 | 32.5 | 200 | 7 |
| 12 | 24.4 | 10 | 230 |
| 13 | 18.3 | 10 | 146 |
| 14 | 6.5 | 10 | 146 |
| 15 | 6.5 | 200 | 29 |
| 16 | 6.5 | 50 | 183 |
| 17 | 6.5 | 200 | 46 |
| 18 | 6.5 | 0.5 | 184 |

Examples 19-23

In Examples 19-23, only the proportion of the added binder in the process of [preparation of a negative electrode sheet] is different, and the other steps are the same as those in Example 1. Table 2 shows weight ratios of graphite, conductive carbon, and binder in each embodiment.

TABLE 2

| Examples | Graphite:conductive carbon:binder |
|---|---|
| 19 | 97.5:2:0.5 |
| 20 | 95.0:2:3.0 |
| 21 | 97.9:2:0.1 |
| 22 | 88.0:2:10.0 |
| 23 | 91.0:2:7.0 |

Comparative Example C1

A binder composition of a water-based binder styrene butadiene rubber (SBR) and a thickener sodium carboxymethyl cellulose (CMC-Na) known in the prior art were used for preparing the negative electrode sheet.

[Preparation of a Negative Electrode Sheet]

An active material artificial graphite, a conductive agent carbon black, a binder styrene butadiene rubber (SBR), and a thickener sodium hydroxymethyl cellulose (CMC-Na) at a weight ratio of 96:2:1.5:0.5 were dissolved in a solvent deionized water. The solution was sufficiently mixed to prepare a negative electrode slurry. The negative electrode slurry was uniformly coated on a negative electrode current collector copper foil once or more than once at a loading capacity of 20 mg/cm$^2$, dried, cold pressed, and cut, to provide the negative electrode sheet.

Then, a secondary battery was prepared according to the steps in Example 1.

Performance test of the negative electrode sheets and the secondary batteries obtained in the above examples and comparative example was performed.

The test method is as follows:

[Test Method for Relevant Parameters of the Binder]

1. Infrared Spectrum Test

According to the infrared spectrum analysis method in the standard GB/T6040-2002, structural composition of the conductive binder in the examples was measured using IS10 Fourier transform infrared spectrometer of Thermo Nicolet Corporation. The test wave number ranges from 600 to 4,000 cm$^{-1}$.

2. Number Average Molecular Weight (Mn) Test

The number average molecular weight (Mn) of the binder compound obtained in each example was measured using HLC-8320GPC gel permeation chromatography (semi-micro SEC column of SuperMultiporeHZ series, with polystyrene as standard substance).

Test method: 2 mg of to-be-tested polymer powder was dissolved in 2 mL of a solvent DMF special for GPC, and then 2.5 μL of the solution was injected for testing.

Parameters:
Pump flow rate: 5 mL/min;
Injection volume: 100 μL;
Temperature control range: 60° C.:
Data collection frequency: 100 Hz.

3. HNMR Test

Molecular structure of the product was determined on Bruker AVANCEIII 400 nuclear magnetic resonance spectrometer at a test temperature of 25° C. using tetramethylsilane (TMS) as internal standard substance, using solvents of deuterated chloroform (CDCl$_3$), deuterated methanol (CD$_3$OD-d4), and deuterated dimethyl sulfoxide (DMSO-d6) respectively.

Test process: 5 mg of a sample was dissolved in the above solvent, then the solution was transferred to a NMR tube, and 1 mL of the sample solution was injected for testing.

Therefore, the molecular structure of the product can be determined, and the values of m and n can be determined.

[Test of Relevant Parameters of the Electrode Sheet]

1. Performance Test of the Binder

The negative electrode sheet in each example and comparative example was cut into a test sample with a length of 100 mm and a width of 10 mm. A double-faced adhesive tape (width: 11 mm) was pasted on a stainless steel plate with a width of 25 mm, one side of the test sample with a negative electrode material layer was pasted on the double-sided adhesive tape on the stainless steel plate, and a 2,000 g compression roller rolled back and forth on a surface thereof at a speed of 300 mm/min three times. Then, one end of the test sample was bent by 180 degrees, the negative electrode material layer of the test sample was manually peeled off by 25 mm from the current collector along a length direction, and the test sample was fixed on an INSTRON 336 test machine in such a way that a peeling surface was consistent with a force line of the test machine (i.e., parallel to a movement direction of the test machine during peeling off), so that the test machine continuously peeled off the test sample at a speed of 30 mm/min, to obtain a peeling force curve. An average value of a steady segment within a range of about 30 s (i.e., a segment that did not increase monotonically on the peeling force curve) was taken as a peeling force F0, and a binding force between the negative electrode material layer and the current collector in the test sample F=F0/width of the test sample (measurement unit of F: N/m).

2. Swelling Rate Test

The negative electrode sheet in each example and comparative example was cut into a test sample with a length of 100 mm and a width of 100 mm, and an initial thickness do of the electrode sheet was measured with a screw micrometer. Then, at 25° C., the electrode sheet was soaked in dimethyl carbonate (DMC) for 1 h, taken out, and then left to stand still, so that DMC naturally volatilized until the electrode sheet was dry. A thickness d1 of the electrode sheet after swelling was measured with the screw micrometer to compute the swelling rate p=(d1−d0)/d0×100%.

3. Test of Ion Conductivity of the Electrode Sheet

The negative electrode sheet in each example and comparative example was assembled into a symmetrical battery, and AC impedance was tested using VMP3 electrochemical workstation at 25° C. Test parameters: frequency count: 73; test number of single frequency points: 2; and test frequency range: 500 kHz-30 mHz. The ion conductivity ρ1 of the electrode sheet can be obtained by fitting and computing the measured data.

[Battery Performance Test]

1. Test of Cycling Capacity Retention Rate of a Battery

At 25° C., a to-be-tested lithium-ion battery was charged to 4.3 V at a constant current of ⅓ C, then charged to a current of 0.05 C at a constant voltage of 4.3 V, laid aside for 5 min, and then discharged to 2.8 V at ⅓ C. The resulting capacity was denoted as an initial capacity C0. The above steps were repeated for the same battery mentioned above, a discharge capacity Cn of the battery was recorded after n-th cycle, and a capacity retention rate of the battery after each cycle was Pn=Cn/C0*100%. In this way, the discharge capacity retention rate after 1,000-th cycle in the examples and the comparative example was measured respectively.

2. 4C Capacity Retention Rate

At 25° C., a battery was charged to 4.3 V at a constant current of ⅓ C, then charged to a current of 0.05 C at a constant voltage of 4.3 V, laid aside for 5 min, and then discharged to 2.8 V at ⅓ C. The resulting capacity was denoted as an initial capacity C0. Then, the battery was charged to 4.3 V at a constant current of ⅓ C. then charged to a current of 0.05 C at a constant voltage of 4.3 V, laid aside for 5 min, and then discharged to 2.8 V at 4C. The resulting capacity was denoted as C1, and the 4C discharge capacity retention rate Pn=C1/C0×100%.

3. Test of DC Impedance (DCR) of the Battery

Test process of the DC impedance of the battery was as follows: at 25° C., the battery was charged to 4.3 V at a constant current of ⅓ C, and then charged to a current of 0.05 C at a constant voltage of 4.3 V, and laid aside for 5 min. Then, a voltage V1 was denoted. Then, the batten was discharged at ⅓ C for 30 s, a voltage V2 was denoted, and an internal resistance of the battery was DCR=(V2−V1)/(⅓C).

[Test Results]

1. Infrared Spectrum Test Results

An infrared spectrum test of the binder prepared in Example 1 was performed to obtain an infrared spectrum, as shown in FIG. 1. 2,883 $cm^{-1}$ is a stretching vibration peak of C—H, 1,405 $cm^{-1}$ is bending vibration of $CH_2$, 1,186 $cm^{-1}$ and 879 $cm^{-1}$ are skeletal vibration of C—C, 615 $cm^{-1}$ and 530 $cm^{-1}$ are vibration peaks of $CF_2$, 1,592 $cm^{-1}$ is a characteristic peak of symmetrical stretching vibration of COO—, 1,406 $cm^{-1}$ is a characteristic peak of asymmetrical stretching vibration of COO—, proving that a structural monomer (I) is successfully synthesized. In addition, a peak at 3,200 $cm^{-1}$ is a stretching vibration peak of O—H, which corresponds to intramolecular, intermolecular, and freely moving hydroxyl; 2,875 $cm^{-1}$ is a stretching vibration peak of C—H, 1,593 $cm^{-1}$ is a characteristic peak of symmetrical stretching vibration of COO—, 1,417 $cm^{-1}$ is a characteristic peak of asymmetrical stretching vibration of COO—; and 1,055 $cm^{-1}$ is a stretching vibration peak of a glucosidic bond C—O—C, proving that a structural monomer (II) is successfully polymerized into the binder structure.

2. Performance Test Results of the Electrode Sheet and the Secondary Battery

The performance test results of the electrode sheet and the secondary battery are shown in Table 3 below.

TABLE 3

Performance test results of the electrode sheet and the secondary battery in Examples 1-21 and Comparative Example C1

| Examples | Compound structure | | | | | | | | | | Electrode sheet preparation Addition amount (wt %) | Electrode sheet performance test | | | Battery performance test | | Cycling capacity retention rate @1,000 cycles |
|---|---|---|---|---|---|---|---|---|---|---|---|---|---|---|---|---|---|
| | $R_1$ | $R_2$ | $R_3$ | $R_4$ | $R_5$ | Z | M | m/n | m | n | | Binding force (N/m) | Electrode sheet swelling rate | Ion conductivity ($10^2$ S/cm) | Battery cell DCR (mΩ) | 4 C capacity retention rate | |
| C1 | / | / | / | / | / | / | / | / | / | / | 2.0 | 15.2 | 12.0% | 8.5 | 0.82 | 75.2% | 82.5% |
| 1 | $C_2H_5$ | $CH_3$ | $CH_3$ | COONa | O | $C_2H_4$ | Na | 2 | 8025 | 4003 | 2.0 | 26.5 | 21.2% | 24.3 | 0.53 | 85.3% | 90.4% |
| 2 | $C_2H_5$ | $C_3H_7$ | $CH_3$ | COONa | O | $C_2H_4$ | Na | 2 | 8112 | 4062 | 2.0 | 25.2 | 19.2% | 21.1 | 0.54 | 84.5% | 89.6% |
| 3 | $C_2H_5$ | $CH_3$ | $CH_3$ | COOLi | O | $C_2H_4$ | Li | 2 | 7998 | 4006 | 2.0 | 25.6 | 20.3% | 22.0 | 0.56 | 84.1% | 90.1% |
| 4 | $C_2H_5$ | Phenyl | $CH_3$ | COONa | O | $C_2H_4$ | Na | 2 | 8005 | 4023 | 2.0 | 23.1 | 18.2% | 19.6 | 0.62 | 83.2% | 87.8% |
| 5 | $C_2H_5$ | $CH_3$ | $CH_3$ | COONa | O | $C_2H_4$ | Na | 2 | 7603 | 3787 | 2.0 | 24.3 | 20.5% | 23.1 | 0.55 | 84.2% | 90.0% |
| 6 | $C_2H_5$ | $CH_3$ | $CH_3$ | COONa | O | $C_2H_4$ | Na | 2 | 23856 | 11995 | 2.0 | 19.6 | 23.6% | 25.3 | 0.60 | 83.6% | 88.6% |

TABLE 3-continued

Performance test results of the electrode sheet and the secondary battery in Examples 1-21 and Comparative Example C1

| | Compound structure | | | | | | | | | | Electrode sheet preparation Addition amount (wt %) | Electrode sheet performance test | | | Battery performance test | |
|---|---|---|---|---|---|---|---|---|---|---|---|---|---|---|---|---|
| Examples | $R_1$ | $R_2$ | $R_3$ | $R_4$ | $R_5$ | Z | M | m/n | m | n | | Binding force (N/m) | Electrode sheet swelling rate | Ion conductivity ($10^{2}$ S/cm) | Battery cell DCR (m Ω) | 4 C capacity retention rate | Cycling capacity retention rate @1,000 cycles |
| 7 | $C_2H_5$ | $CH_3$ | $CH_3$ | COONa | O | $C_2H_4$ | Na | 2 | 46886 | 23523 | 2.0 | 17.1 | 26.5% | 26.6 | 0.62 | 82.2% | 84.2% |
| 8 | $C_2H_5$ | $CH_3$ | $CH_3$ | COONa | O | $C_2H_4$ | Na | 0.1 | 9438 | 93560 | 2.0 | 16.5 | 15.6% | 18.8 | 0.61 | 81.3% | 84.1% |
| 9 | $C_2H_5$ | $CH_3$ | $CH_3$ | COONa | O | $C_2H_4$ | Na | 5 | 18020 | 3598 | 2.0 | 21.0 | 25.8% | 28.4 | 0.65 | 80.1% | 88.7% |
| 10 | $C_2H_5$ | $CH_3$ | $CH_3$ | COONa | O | $C_2H_4$ | Na | 7.5 | 29896 | 4052 | 2.0 | 18.0 | 26.2% | 29.2 | 0.64 | 80.6% | 87.4% |
| 11 | $C_2H_5$ | $CH_3$ | $CH_3$ | COONa | O | $C_2H_4$ | Na | 10 | 40023 | 4021 | 2.0 | 17.3 | 26.4% | 29.4 | 0.65 | 80.2% | 84.3% |
| 12 | $C_2H_5$ | $CH_3$ | $CH_3$ | COONa | O | $C_2H_4$ | Na | 0.4 | 30005 | 75106 | 2.0 | 21.2 | 21.8% | 22.5 | 0.62 | 81.4% | 85.6% |
| 13 | $C_2H_5$ | $CH_3$ | $CH_3$ | COONa | O | $C_2H_4$ | Na | 0.5 | 22523 | 44869 | 2.0 | 21.3 | 22.5% | 22.5 | 0.62 | 81.5% | 85.4% |
| 14 | $C_2H_5$ | $CH_3$ | $CH_3$ | COONa | O | $C_2H_4$ | Na | 0.5 | 8006 | 16106 | 2.0 | 19.3 | 20.2% | 22.2 | 0.63 | 81.2% | 85.7% |
| 15 | $C_2H_5$ | $CH_3$ | $CH_3$ | COONa | O | $C_2H_4$ | Na | 1 | 8012 | 8022 | 2.0 | 23.4 | 20.9% | 23.3 | 0.62 | 80.8% | 89.5% |
| 16 | $C_2H_5$ | $CH_3$ | $CH_3$ | COONa | O | $C_2H_4$ | Na | 4 | 8056 | 2003 | 2.0 | 25.3 | 24.8% | 27.9 | 0.64 | 83.1% | 87.7% |
| 17 | $C_2H_5$ | $CH_3$ | $CH_3$ | COONa | O | $C_2H_4$ | Na | 5 | 8105 | 1613 | 2.0 | 28.3 | 25.2% | 28.3 | 0.65 | 81.0% | 88.9% |
| 18 | $C_2H_5$ | Phenyl | $CH_3$ | COONa | O | $C_2H_4$ | Na | 0.1 | 8004 | 79985 | 2.0 | 16.3 | 15.3% | 18.6 | 0.61 | 81.2% | 84.1% |
| 19 | $C_2H_5$ | $CH_3$ | $CH_3$ | COONa | O | $C_2H_4$ | Na | 2 | 8053 | 4013 | 0.5 | 16.1 | 15.2% | 15.6 | 0.55 | 83.8% | 85.2% |
| 20 | $C_2H_5$ | $CH_3$ | $CH_3$ | COONa | O | $C_2H_4$ | Na | 2 | 8066 | 3988 | 3.0 | 29.2 | 22.5% | 24.6 | 0.56 | 83.6% | 86.3% |
| 21 | $C_2H_5$ | $CH_3$ | $CH_3$ | COONa | O | $C_2H_4$ | Na | 2 | 8038 | 4056 | 0.1 | 15.8 | 14.1% | 16.6 | 0.66 | 79.2% | 84.9% |
| 22 | $C_2H_5$ | $CH_3$ | $CH_3$ | COONa | O | $C_2H_4$ | Na | 2 | 7986 | 4086 | 10.0 | 33.2 | 33.5% | 29.3 | 0.68 | 77.1% | 83.8% |
| 23 | $C_2H_5$ | $CH_3$ | $CH_3$ | COONa | O | $C_2H_4$ | Na | 2 | 7934 | 4116 | 7.0 | 31.2 | 31.8% | 28.8 | 0.67 | 77.8% | 84.1% |

As can be seen from the above table, compared with the existing water-based binder in Comparative Example C1, the binder compound, the electrode sheet, and the secondary battery in the present application are somewhat improved in at least one of the following aspects:

In terms of binding property, the binding force of the binder compound in each example of the present application is somewhat improved.

In terms of electrode sheet performance, the swelling rate of the electrode sheet in the present application is significantly improved. It is known that the ion conductivity of the electrode sheet is positively correlated with the swelling rate. The higher the swelling rate is, the more the electrolyte solution can be absorbed by the electrode sheet, and the higher the ion conductivity is. Correspondingly, the ion conductivity of the electrode sheet in the present application is also obviously improved.

In terms of battery performance, the internal resistance of the battery cell comprising the negative electrode sheet in the present application is obviously reduced, and at least one of its 4C capacity retention rate and cycling capacity retention rate is somewhat improved.

It should be noted that the present application is not limited to the above embodiments. The above embodiments are merely exemplary, and embodiments having substantially the same technical idea and the same effects within the scope of the technical solutions of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A binder compound of formula (I):

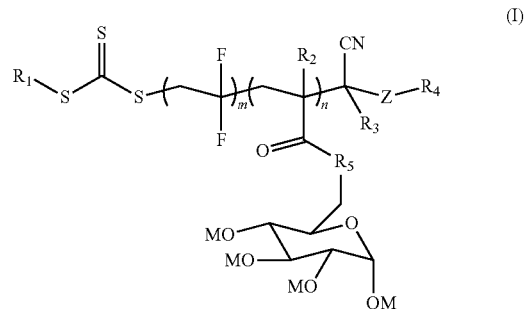

(I)

wherein $R_1$, $R_2$, and $R_3$ each independently represents an unsubstituted or substituted linear or branched alkyl with 1-6 carbon atoms, or an unsubstituted or substituted aryl with 6-20 carbon atoms;

$R_4$ represents —COOM;

$R_5$ represents a bridging oxo or bridging imino;

each M independently represents one of Li, Na, K, Rb, and Cs;

Z represents a linear or branched alkylene with 1-6 carbon atoms;

m is an integer selected from 7,600 to 47,000;

n is an integer selected from 1,520 to 94,000; and m/n=0.1-10.

2. The binder compound according to claim 1, wherein $R_1$ and $R_3$ each independently represents an unsubstituted linear or branched alkyl with 1-6 carbon atoms.

3. The binder compound according to claim 1, wherein $R_2$ represents an unsubstituted linear or branched alkyl with 1-6 carbon atoms or phenyl.

4. The binder compound according to claim 1, wherein m is an integer selected from 7,600 to 30,000.

5. The binder compound according to claim 1, wherein n is an integer selected from 1,520-46,000.

6. The binder compound according to claim 1, wherein m/n=0.3-7.5.

7. A method for preparing a binder compound of formula (I),

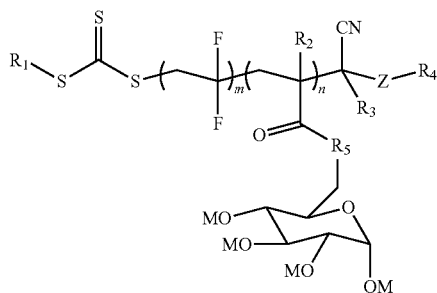

wherein
$R_1$, $R_2$, and $R_3$ each independently represents an unsubstituted or substituted linear or branched alkyl with 1-6 carbon atoms, or an unsubstituted or substituted aryl with 6-20 carbon atoms;
$R_4$ represents —COOM,
$R_5$ represents a bridging oxo or bridging imino;
each M independently represents one of Li, Na, K, Rb, and Cs;
Z represents a linear or branched alkylene with 1-6 carbon atoms;
m is an integer selected from 7,600 to 47,000;
n is an integer selected from 1,520 to 94,000; and
m/n=0.1-10;
the method comprising following steps:
(i) allowing a polymerization reaction of a vinylidene fluoride monomer in the presence of a chain transfer agent of formula (II) to obtain a polymer of formula (III):

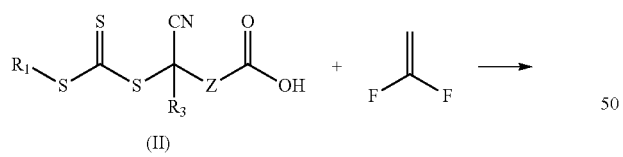

wherein $R_1$, $R_3$, Z, and m are defined as above respectively; and
optionally, the chain transfer agent of formula (II) is 4-cyano-4-thioylthiopropylsulfanyl pentanoic acid;
(ii) allowing a polymerization reaction between a glucose acrylic acid derivative of formula (IV) and polyvinylidene fluoride of formula (III) to obtain a polymer of formula (I'):

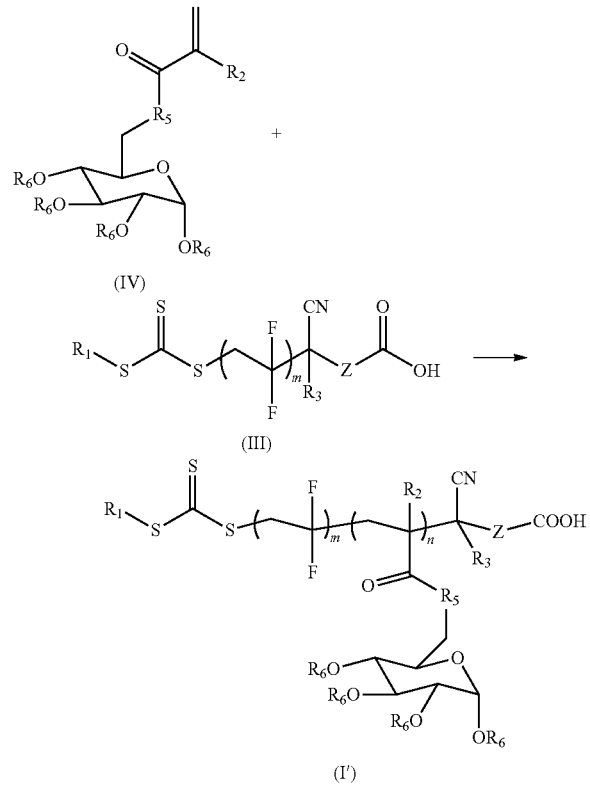

wherein $R_1$, $R_2$, $R_3$, Z, m, n, and m/n are as defined above respectively,
$R_5$ represents a bridging oxo or bridging imino, and
$R_6$ represents acetyl;
and (iii) reacting the polymer obtained in the step (ii) with an alkali metal alkoxide $R_7$OM to obtain the binder compound of formula (I):

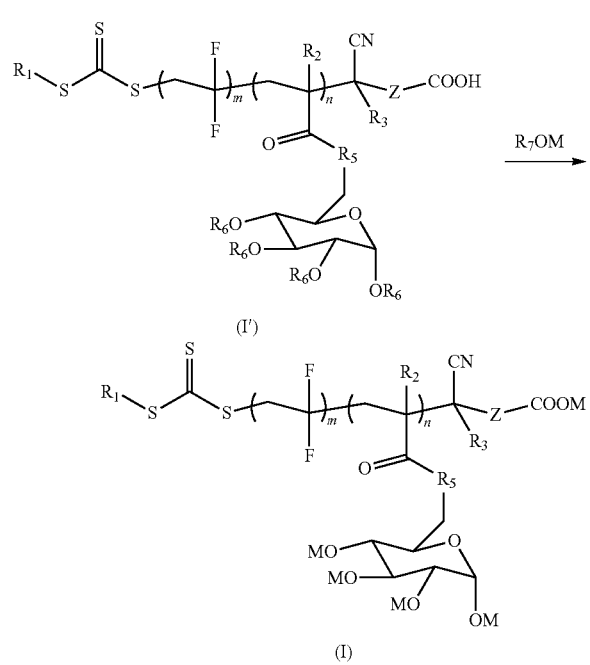

wherein R$_7$ is selected from a linear or branched alkyl with 1-6 carbon atoms.

8. The method according to claim 7, wherein the glucose acrylic acid derivative of formula (IV) is obtained from glucose or 6-aminoglucose by:
   (1) reacting glucose or 6-aminoglucose with a first protective reagent, so that 6-primary hydroxyl or primary amino thereof is protected by a first protective group;
   (2) reacting the product in the step (1) with acetic anhydride, so that 1-hydroxyl to 4-hydroxyl thereof are protected by acetyl;
   (3) removing the first protective group from the product in the step (2); and
   (4) reacting the product in the step (3) with acryloyl chloride or a derivative thereof to obtain the glucose acrylic acid derivative of formula (IV).

9. The method according to claim 8, wherein the first protective reagent is triphenylchoromethane, and the first protective group is triphenylmethyl.

10. The method according to claim 8, wherein the step (3) is performed in the presence of hydrogen bromide.

11. An electrode sheet, comprising a current collector and an electrode sheet material layer provided on at least one surface of the current collector, wherein the electrode sheet material layer comprises the binder compound according to claim 1.

12. The electrode sheet according to claim 11, wherein the electrode sheet is a negative electrode sheet.

13. The electrode sheet according to claim 12, wherein the electrode sheet material layer of the negative electrode sheet comprises 0.1-10 wt % of the binder compound based on a total weight of the electrode sheet material layer.

14. A secondary battery, comprising the binder compound according to claim 1.

15. A battery module, comprising the secondary battery according to claim 14.

16. A battery pack, comprising the battery module according to claim 15.

17. An electrical apparatus, comprising the battery pack according to claim 16.

* * * * *